(12) United States Patent
Osterwalder et al.

(10) Patent No.: US 9,077,541 B2
(45) Date of Patent: *Jul. 7, 2015

(54) METHODS AND SYSTEMS FOR STORAGE OF LARGE DATA OBJECTS

(71) Applicant: Google Inc., Mountain View, CA (US)

(72) Inventors: Cyrill Osterwalder, Mountain View, CA (US); Christophe DeCanniere, Mountain View, CA (US); Bartosz Jan Przydatek, Mountain View, CA (US); Umesh Shankar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/296,008

(22) Filed: Jun. 4, 2014

(65) Prior Publication Data

US 2014/0289539 A1 Sep. 25, 2014

Related U.S. Application Data

(63) Continuation of application No. 13/788,982, filed on Mar. 7, 2013, now Pat. No. 8,782,441.

(51) Int. Cl.
*G06F 11/30* (2006.01)
*H04L 9/32* (2006.01)
*G06F 21/60* (2013.01)
*G06F 21/62* (2013.01)

(52) U.S. Cl.
CPC ............ *H04L 9/3242* (2013.01); *G06F 21/602* (2013.01); *G06F 21/6218* (2013.01); *G06F 2221/2107* (2013.01)

(58) Field of Classification Search
CPC ................... G06F 21/6218; G06F 2221/2107
USPC ........................................................ 713/193
See application file for complete search history.

(56) References Cited

U.S. PATENT DOCUMENTS

| | | | |
|---|---|---|---|
| 8,429,428 B2 * | 4/2013 | Ignatius et al. | 713/193 |
| 8,601,600 B1 | 12/2013 | Shankar et al. | |
| 8,689,279 B2 * | 4/2014 | Basmov et al. | 726/1 |
| 2012/0036366 A1 * | 2/2012 | May et al. | 713/176 |
| 2012/0060035 A1 * | 3/2012 | Kalmady et al. | 713/176 |
| 2013/0013931 A1 * | 1/2013 | O'Hare et al. | 713/189 |

* cited by examiner

*Primary Examiner* — Teshome Hailu
(74) *Attorney, Agent, or Firm* — Fox Rothschild LLP

(57) ABSTRACT

A storage service receives a binary large object (blob) for storage, and the service creates first and second sets of data chunks from the blob. The chunks in the first set together equal the blob, and the service uses one or more encryption keys to encrypt each of the data chunks in the first set. The chunks in the second set also together equal the blob. The service assigns a message authentication code (MAC) to each data chunk in the second set. The service stores the encrypted data chunks in one or more data stores, and it stores the encryption keys and the MACs as metadata in a metadata memory.

15 Claims, 5 Drawing Sheets

METHODS AND SYSTEMS FOR STORAGE OF LARGE DATA OBJECTS

RELATED APPLICATIONS AND CLAIM OF PRIORITY

This patent document is a continuation of, and claims priority to, U.S. patent application Ser. No. 13/788,982, filed Mar. 7, 2013, titled "Methods and Systems for Storage of Large Data Objects." The disclosure of the priority application is incorporated into this document by reference in its entirety.

BACKGROUND

Data storage facilities face challenges when storing large data objects in a secured format. The facility will typically use an encryption technique to secure the data object. Encryption is the process of converting data from an unencrypted format to an encrypted format. The unencrypted format is readable and unsecured. The encrypted format, sometimes called ciphertext, is unreadable except to those who can decrypt the data using an encryption key.

When multiple large objects are stored, duplication of those large objects can require significant amounts of storage memory. Thus, a facility may desire to avoid duplicating large objects in storage. However, de-duplication (i.e., the avoidance of duplication) can be difficult, especially when the original object is encrypted.

This document describes methods and systems that are directed to addressing some of the problems described above, and/or other problems.

SUMMARY

In an embodiment, when receiving a binary large object (blob) for storage, a storage service may receive the blob and create a first set of one or more data chunks. Each of the data chunks in the first set is a subset of the blob, and together the data chunks in the first set equal the blob. The service may assign an encryption key to each data chunk in the first set and encrypt each of the data chunks in the first set to form a set of encrypted data chunks. The service also may create, from the first set, a second set of one or more ciphertext chunks. Each of the ciphertext chunks in the second set is a subset of the blob, and together the ciphertext data chunks in the second set equal the blob. The service may assign a message authentication code (MAC) to each ciphertext chunk in the second set. The service may store the encrypted data chunks in one or more data stores, and store the encryption keys and the MACs as metadata in a metadata memory. The metadata memory may be separate from the data stores.

Optionally, when assigning the encryption key to at least one of the data chunks in the first set, the service may determine a content-derived key for one or more of the chunks. Alternatively, or in addition, the service may generate a randomly-generated key for at least one of the chunks. The service also may generate a metadata encryption key and use the metadata encryption key to encrypt the metadata.

In some embodiments, the service may store, in the metadata, a data store location. The data store location corresponds to a storage location of one or more of the data chunks in the first or second set. The service also may receive first user authentication information corresponding to a first authorized user of the blob, and store a first access control list in a memory that is separate from the data store. The first access control list may include data relating to the first user authentication information. The memory in which the access control list is stored also may be separate from the metadata memory.

In some embodiments, the service also may receive a second instance of the blob, receive second user authentication information corresponding to a second authorized user of the blob, discard the second instance of the blob without storing the second instance in the data store, and store data relating to the second user authentication information in a second access control list.

In some embodiments, the service also may receive an access request from a user, wherein the access request includes a user authentication credential. The service may verify the user authentication credential based on the access request, access the metadata to retrieve the encryption keys and the MACs for the blob, retrieve the encrypted data chunks from the data store, use the MACs to verify integrity of the data chunks, use the encryption keys to decrypt the encrypted data chunks, and return the blob to the user. Storing the encryption keys and the MACs as metadata may include assigning a key, encrypting the metadata with the assigned key, and wrapping the assigned key. Accessing the metadata may include unwrapping the wrapped key to yield an unwrapped key, and using the unwrapped key to decrypt the metadata.

Any or all of the actions described above may be performed by a storage service that includes one or more processors, a non-transitory memory containing program instructions, one or more data stores, and a metadata memory.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, an "electronic device" refers to a device that includes a processor and tangible, computer-readable memory. The memory may contain programming instructions that, when executed by the processor, cause the device to perform one or more operations according to the programming instructions. Examples of electronic devices include personal computers, gaming systems, televisions, and portable electronic devices such as smartphones, personal digital assistants, cameras, tablet computers, laptop computers, media players and the like.

A "binary large object", sometimes referred to in this document as a "blob," is a large data object, typically comprising binary code, that is stored or received for storage by a storage service. "Large" refers to a size for which temporarily storing the entire object into a local memory during encryption and/or decryption would be impractical. Depending on the amount of local resources and the number of blobs that need to be processed, at the time of this writing a blob may have a size of 10 megabytes (MB) or higher, 20 MB or higher, or 25 MB or higher. Other, larger sizes are possible.

A "client device" refers to an electronic device that is configured to access one or more administered resources over a network. A client device may be a portable or stationary electronic device. A "client application" refers to an application program configured to instruct a client device to perform one or more tasks.

A "storage service" refers to one or more devices that store data received from one or more client devices. The data may include application data, data files, programming instructions, and/or other data. A "datastore" is a tangible, computer-readable memory device, or a group of such devices, within a hosted storage service.

A "wrapped key" refers to an encryption key that is itself encrypted using any suitable encryption technique.

Figure 1:
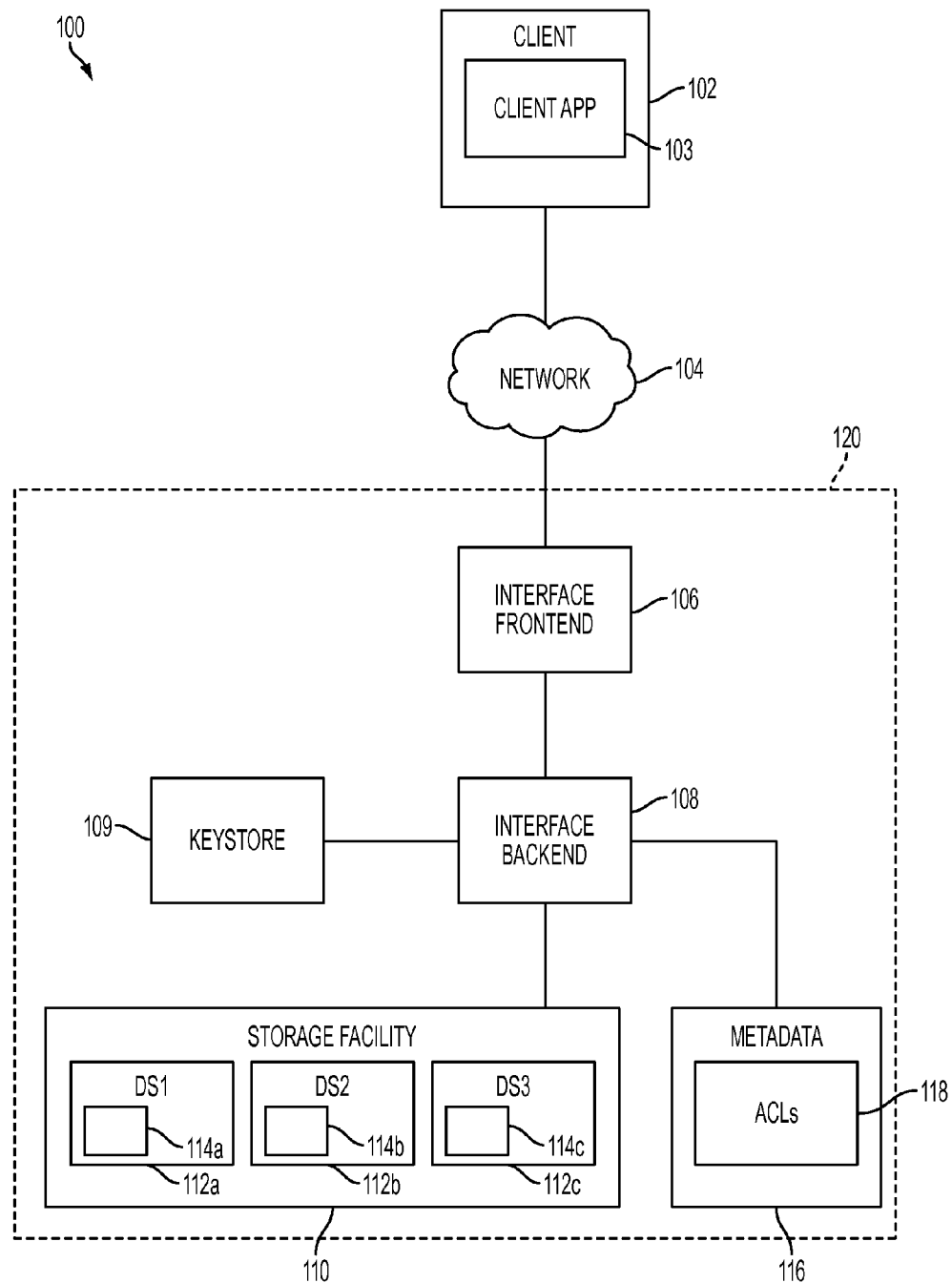
FIG. 1 depicts an example of how a client device may interact with a storage service.

FIG. 1 illustrates a system 100 for transferring information between a client device 102 and a storage service 120 according to an embodiment. In an embodiment, one or more client devices 102 may be connected to one or more communication networks 104. In an embodiment, client device 102 may include a tangible, computer-readable memory on which is stored a client software application 103 that contains instructions for interacting with the storage service 120. The storage service may or may not be a cloud-based storage service that is remote from the client's location.

The communication network 104 may be connected to a storage service 120. The storage service 120 stores data on one or more storage facilities 110. Storage facilities 110 may include data servers having a tangible, computer-readable memory to store data. Any of the storage facilities 110 may be scalable by including two or more individual datastores 112a-112c. The datastores may serve as backups to each other, or they may be taken on or offline to create a larger or smaller overall storage facility depending on demand. In some embodiments, one or more of the data stores may be used to store data 114a-114c of a particular format. For example, data store 112a may store data 114a as Binary Large Object (BLOB) data, data store 112b may store data 114b in a distributed file system (e.g., Network File System), and data store 112c may store data 114c in a structured data format such as a database.

In various embodiments, the communication network 104 may be a local area network (LAN), a wide area network (WAN), a mobile or cellular communication network, an extranet, an intranet, the Internet and/or the like. In an embodiment, the communication network 104 may provide communication capability between the client device 102, an interface frontend server device 106 and an interface backend server device 108. The client device 102 may communicate across the network 104 using any suitable communications protocol, such as Transmission Control Protocol/Internet Protocol (TCP/IP), Hypertext Transfer Protocol (HTTP), Secure Shell Remote Protocol (SSH), or Application Program Interfaces (API). Although FIG. 1 only shows one client device 102, multiple client devices may communicate with the hosted storage service 120 across one or more networks.

In an embodiment, the hosted storage service 120 may include an interface frontend device 106 which operates as a management server to receive requests from and send responses to the client device 102. The interface frontend device 106 may include a processor in communication with a computer-readable storage medium. The interface frontend device 106 may be in communication with one or more client devices 102 and/or the interface backend device 108. The interface frontend device 106, although depicted as a single computer system, may be implemented as multiple devices. The interface frontend device 106 may receive messages (e.g., requests) from the client device 102 and parse the request into a format that can be used by the hosted storage service 120, such as a remote procedure call (RPC) to a management server such as the interface frontend device 106. The interface frontend device 106 may prepare responses generated by the hosted storage service 120 for transmission to the client 102.

Some or all of the data resources stored in each storage facility 110 may be stored in encrypted format or unencrypted format. Data resources that are stored in encrypted format may be associated with one or more encryption keys that are stored in and/or provided by a keystore facility 109, which is a tangible memory that manages the issuance of encryption keys. Any or all of the stored data resources also may be associated with metadata 116 that is stored on a tangible, computer-readable memory. Example types of, and uses for, metadata will be described below.

The interface backend device 108 may include a processor in communication with a computer-readable storage medium. The interface backend device 108 may be in communication with one or more client devices 102 and/or the interface frontend device 106. The interface backend device 108, although depicted as a single computer system, may be implemented as multiple devices. The interface backend device 108 may operate as an authentication server to handle authentication of client requests, management of data resources and metadata, and key retrieval and distribution. In some embodiments, data management may be primarily or fully performed by the interface backend device 108, while external communications may be primarily or fully performed by the interface frontend device 106. Thus, in such embodiments, the interface backend device 108 may isolate the data resources from the client/facing interface frontend device 106 until authentication is performed.

The interface backend device 108 manages metadata 116 associated with the data resources that are in the storage facility 110. For example, a client may request access to a data resource using a data identifier, and the metadata may map the identifier to one or more of the datastores 112a-112c that store the resource. The metadata also may include information such as resource creation times, information about one or more groups or categories to which the resource belongs, resource size, hashes, and access control lists (ACLs) 118 for the resources and groups, or other suitable information. The metadata, or other metadata that is handled separately, may include blob-related encryption metadata and ACL-related access metadata. The interface backend device 108 may log activity for each resource, such as information about who accessed each resource and times of access.

The ACLs 118 may identify which clients (i.e., which users) are authorized to perform actions on data resources or groups of data resources, and/or what actions may be performed on each resource or group. As used in this document, a user may be an individual or another identifier such as an invite token or an application identifier. In some embodiments, the ACLs 118 may include an ordered list of {scope, role} pairs and Boolean flags. The scope may identify the users or groups of users who may access the resource or group, while the roles may identify the access permissions for the user or group.

Any given ACL 118 may include a resource encryption key for its associated data resource. The encryption key may be wrapped, and it may have been generated by the keystore 109, by the interface backend device 108, or by another entity. In some embodiments the key may be stored in the keystore 109 and retrieved by the interface backend device 108. Alternatively, the key may be included within the ACL 118 for an object or group.

In some embodiments, one or more elements of the storage service 120, such as the interface frontend device 106, may include programming instructions configured to manage uploads and downloads of large files. This may include functionality such as pausing, resuming, and recovering an upload from time-out. The storage service 120 may monitor load information and update logs, for example to track and protect against denial of service (DOS) attacks.

Figure 2:
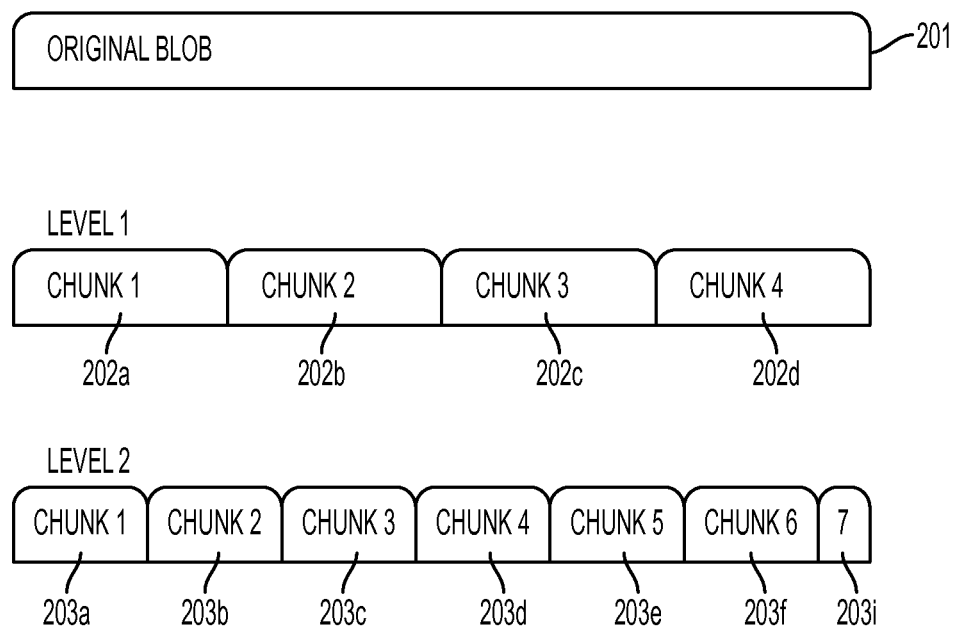
FIG. 2 illustrates shows how a storage service may divide a data object into smaller objects for storage and integrity verification.

FIG. 2 illustrates a high-level diagram of a method of receiving and storing a binary large object, or blob. A storage service may receive a blob 201, generally in plaintext or unencrypted format. The service may divide the blob into a first set of two or more smaller data objects 202a-202d, each referred to herein as a "chunk." Or, if the blob is itself sufficiently small, it may be considered a chunk by itself. The first set may be referred to as a "Level" set. All chunks in the Level 1 set, taken together, form the original blob 201. The service may also divide the first set into a second (or "Level 2") set of one or more chunks 203a-203i. All chunks in the Level 2 set are ciphertext chunks and, taken together and decrypted, also form the original blob 201. The number and sizes of the chunks in the Level 1 set may match the number and size of those in the Level 2 set, or the number and sizes in each set may differ as shown in FIG. 2, for example. Similarly, the size of each chunk within a set may or may not be the same.

Each chunk in the Level 1 set is encrypted, optionally using a unique key for each chunk or for a set of chunks. A message authentication code (MAC) is generated for each chunk in the second set. The use of the Level 1 and Level 2 chunks will be discussed in the context of FIG. 3 below.

Figure 3:
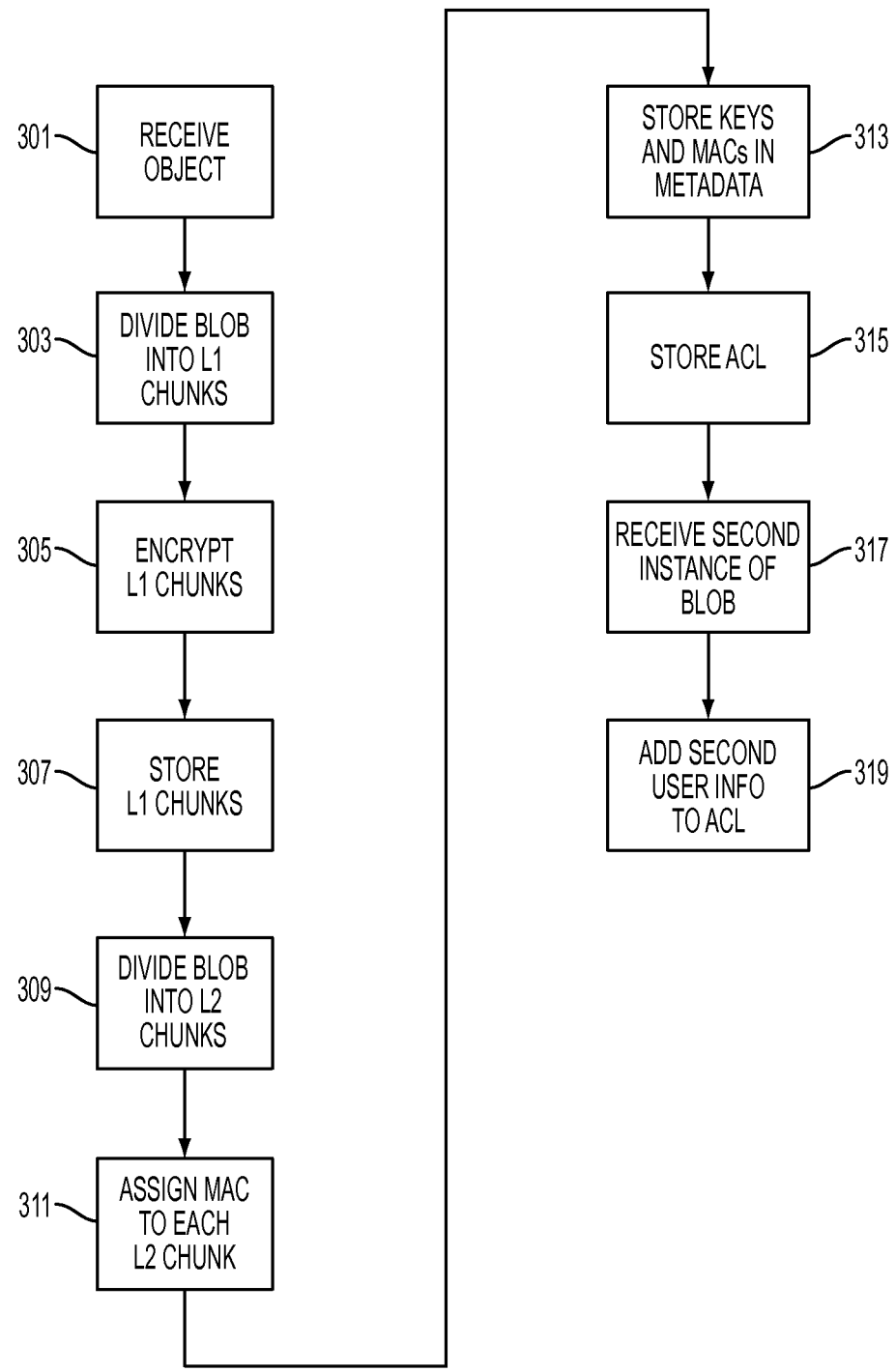
FIG. 3 is a flowchart showing a process for storing a data object and certain information related to the object.

Referring to FIG. 3, when a storage service receives a blob 301, it may divide the blob into a first set of Level 1 chunks 303. Unlike prior de-duplication methods which simply divide unencrypted data into unencrypted chunks, the service will separately encrypt 305 each Level 1 chunk, optionally using a unique encryption key for each chunk or for a set of chunks. The key may be a content-derived key, or it may be a randomly-derived key. A content-derived key may be derived from the content of the Level 1 chunk itself. The encrypted chunks will be stored 307 in one or more data stores. The service will also use the first set to divide the object into a second set of Level 2 ciphertext data chunks 309 and assign a message authentication code (MAC) to each Level 2 data chunk 311. The system will store the encryption keys and the MACs for the binary large object as metadata 313 in a memory that is separate from the data stores, or in a separate section of memory within the data stores. The metadata also may include other information about the blob, such as an address or information indicating where in the data store the blob's chunks are located. Optionally, when storing the metadata, the system may assign a wrapped key and use the wrapped key to encrypt the metadata.

For each blob, the storage facility may store encryption keys in an access control list (ACL) 315. The ACL may be stored with the metadata, or it may be stored in a memory that is separate from the memory that holds the other blob metadata described above.

The service may avoid duplication of the blobs in the data store by checking each newly-received blob against previous blobs to determine whether the new blob matches a stored blob. This may be done by creating a ciphertext payload for each blob and detecting equal blobs based on equal ciphertext, using any available de-duplication mechanism. When a user provides the service with a duplicate (i.e., second instance) of a blob that is already stored in a datastore 317, the service will refrain from storing the second instance of the binary large object in a datastore, and instead may merely discard the second instance and add a second ACL containing a wrapped key for the second user 319. Thus, the system can manage each authorized user's access to the blob.

Figure 4:
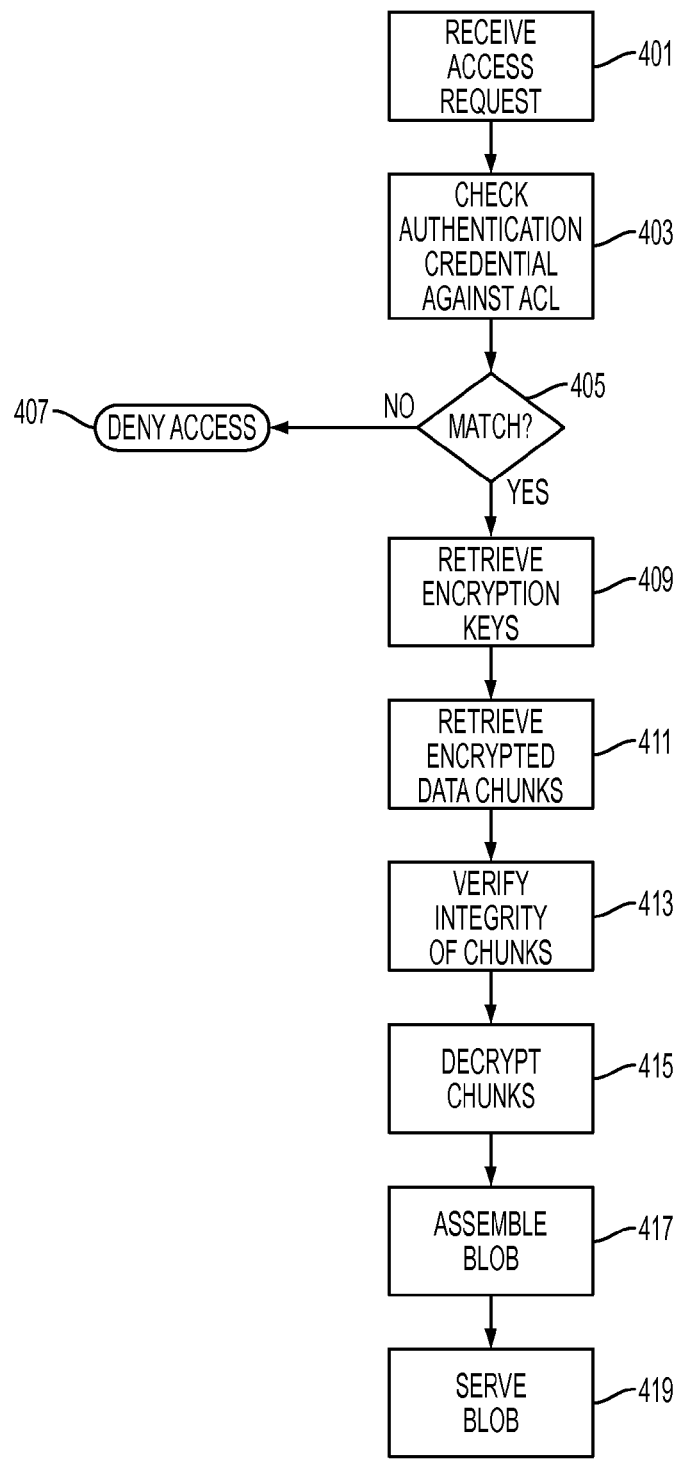
FIG. 4 is a flowchart showing a process for retrieving an encrypted data object.

FIG. 4 illustrates steps that the system may follow in response to its receipt of a request to access the encrypted blob. The request 401 may arrive from a user in the form of an access request that includes a user authentication credential. The system may check the ACL 403 to confirm that the user's authentication credential matches one that is contained in the ACL 405. If there is no match, the system may deny the request 407 and/or ask the user to re-submit an authentication credential. If there is a match, the system may access the metadata to retrieve the unique encryption keys and the MACs for the blob 409. The system also will retrieve the encrypted data chunks from the data store 411. The system may then use the MACs to verify the integrity of the encrypted data chunks 413, and use the encryption keys to decrypt the encrypted data chunks 413. If the metadata was stored with a wrapped key, to access the metadata the system may unwrap the wrapped key and use the unwrapped key to also decrypt the metadata. The system will then optionally assemble the chunks into the blob 417 and serve the blob to the user 419.

In the embodiments described above, the chunk size of Level 1 chunks may be limited to the size that the processor and memory used can handle at once for key calculation and encryption. A capacity of at least the Level 1 chunk size may be required during encryption, and a capacity of at least the Level 2 chunk size may be required during decryption, in order to allow for the plaintext and ciphertext of a chunk to be handled. The chunk size of Level 2 chunks may be a customizable parameter, a default, or a parameter that is determined on a case-by-case basis. Smaller chunks may require more overall memory because a greater number of chunks require more overall metadata than fewer chunks. The chunk sizes of Level 1 and Level 2 may or may not be the same.

Figure 5:
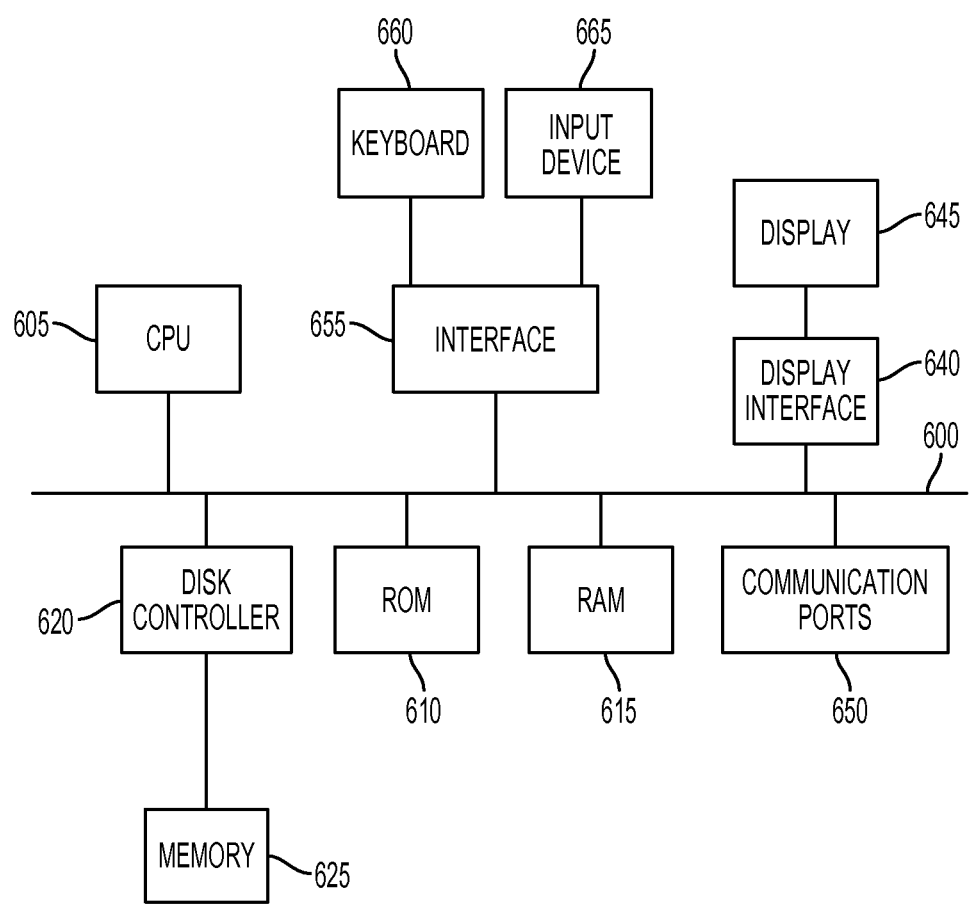
FIG. 5 illustrates various elements of an example of a computing device.

FIG. 5 is a block diagram of an example set of hardware that may be used to contain or implement program instructions according to an embodiment. A bus 600 serves as an information pathway interconnecting the other illustrated components of the hardware. CPU 605 is a central processing unit of the system, performing calculations and logic operations required to execute a program. Read only memory (ROM) 610 and random access memory (RAM) 615 constitute examples of memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions may be stored in the ROM 610 and/or the RAM 615. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 640 may permit information from the bus 600 to be displayed on the display 645 in audio, visual, graphic or alphanumeric format. Communication with external devices may occur using various communication ports 650. In some embodiments, a communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
   receiving, by a storage service, a binary large object;
   by a processor of the storage service, creating a first set of data chunks, wherein each of the data chunks in the first set is a subset of the object, and together the data chunks in the first set equal the object;
   by the processor, assigning an encryption key to each data chunk in the first set;
   encrypting each of the data chunks in the first set to form a set of encrypted data chunks;
   by the processor, creating a second set of ciphertext chunks, wherein each of the ciphertext chunks in the second set will, taken together and decrypted, form the binary large object;
   by the processor, assigning a message authentication code (MAC) to each data chunk in the second set;
   storing the encrypted data chunks in one or more data stores;
   storing the encryption keys and the MACs as metadata in a metadata memory, wherein the metadata memory is separate from the one or more data stores;
   receiving, by the storage service, first user authentication information corresponding to a first authorized user of the binary lame object;
   storing, in a memory that is separate from the data store, a first access control list, wherein the first access control list includes data relating to the first user authentication information;
   receiving, by the storage service, a second instance of the binary lame object;
   receiving, by the storage service, second user authentication information corresponding to a second authorized user of the binary lame object;
   discarding the second instance of the binary lame object without storing the second instance in the data store; and
   storing, in a second access control list, data relating to the second user authentication information.

2. The method of claim 1, wherein storing the metadata comprises assigning a metadata encryption key and using the metadata encryption key to encrypt the metadata.

3. The method of claim 1, wherein assigning the encryption key to at least one of the data chunks in the first set comprises determining a content-derived key for the at least one chunk.

4. The method of claim 1, wherein assigning the encryption key to at least one of the data chunks in the first set comprises generating a randomly-generated key for the at least one chunk.

5. The method of claim 1, further comprising storing, in the metadata, a data store location, wherein the data store location corresponds to a storage location of one or more of the data chunks in the first set or in the second set.

6. The method of claim 1, wherein the memory in which the access control list is stored is also separate from the metadata memory.

7. The method of claim 1, further comprising:
   receiving, by the storage service, an access request from a user, wherein the access request includes a user authentication credential;
   verifying, by the storage service, the user authentication credential based on the access request;
   accessing the metadata to retrieve the encryption keys and the MACs for the binary large object;
   retrieving the encrypted data chunks from the data store;
   using the MACs to verify integrity of the encrypted data chunks;
   using the encryption keys to decrypt the encrypted data chunks; and
   returning the binary large object to the user.

8. The method of claim 7, wherein:
   storing the encryption keys and the MACs as metadata comprises assigning a key, encrypting the metadata with the assigned key, and wrapping the assigned key; and
   accessing the metadata comprises unwrapping the wrapped key to yield an unwrapped key, and using the unwrapped key to decrypt the metadata.

9. A method, comprising:
   receiving, by a storage service, a binary large object;
   by a processor of the storage service, creating a first set of data chunks, wherein each of the data chunks in the first set is a subset of the object, and together the data chunks in the first set equal the object;
   by the processor, assigning an encryption key to each data chunk in the first set;
   encrypting each of the data chunks in the first set to form a set of encrypted data chunks;
   by the processor, creating a second set of ciphertext chunks, wherein each of the data chunks in the second set will, taken together and decrypted, form the binary large object;
   by the processor, assigning a message authentication code (MAC) to each ciphertext chunk in the second set;
   storing the encrypted data chunks in one or more data stores;
   determining a data store location, wherein the data store location corresponds to a storage location of one or more of the data chunks in the first set;
   storing the encryption keys, the data store location and the MACs as metadata in a metadata memory, wherein the metadata memory is separate from the one or more data stores, and wherein storing the metadata comprises assigning a metadata encryption key and using the metadata encryption key to encrypt the metadata;
   receiving, by the storage service, first user authentication information corresponding to a first authorized user of the binary lame object;

storing, in a memory that is separate from the data store, a first access control list, wherein the first access control list includes data relating to the first user authentication information;

receiving, by the storage service, a second instance of the binary lame object;

receiving, by the storage service, second user authentication information corresponding to a second authorized user of the binary lame object;

discarding the second instance of the binary lame object without storing the second instance in the data store; and storing, in a second access control list, data relating to the second user authentication information.

10. The method of claim 9, wherein assigning the encryption key to at least one of the data chunks in the first set comprises determining a content-derived key for the at least one chunk.

11. The method of claim 9, wherein assigning the encryption key to at least one of the data chunks in the first set comprises generating a randomly-generated key for the at least one chunk.

12. The method of claim 9, further comprising:
receiving, by the storage service, an access request from a user, wherein the access request includes a user authentication credential;
verifying, by the storage service, the user authentication credential based on the access request;
accessing the metadata to retrieve the encryption keys and the MACs for the binary large object;
retrieving the encrypted data chunks from the data store;
using the MACs to verify integrity of the encrypted data chunks;
using the encryption keys to decrypt the encrypted data chunks; and
returning the binary large object to the user.

13. The system of claim 12, wherein the program instructions, when executed, also instruct one or more of the processors to:
receive an access request from a user, wherein the access request includes a user authentication credential;
verify the user authentication credential based on the access request;
access the metadata to retrieve the encryption keys and the MACs for the binary large object;
retrieve the encrypted data chunks from the data store;
use the MACs to verify integrity of the encrypted data chunks;
use the encryption keys to decrypt the encrypted data chunks; and
return the binary large object to the user.

14. A system, comprising:
a storage service comprising one or more processors, a non-transitory memory containing program instructions, one or more data stores, and a metadata memory that is separate from the one or more data stores,
wherein the program instructions, when executed, instruct one or more of the processors to:
receive a binary large object;
create a first set of data chunks, wherein each of the data chunks in the first set is a subset of the object, and together the data chunks in the first set equal the object;
assign an encryption key to each data chunk in the first set;
encrypt each of the data chunks in the first set to form a set of encrypted data chunks;
create a second set of ciphertext chunks, wherein each of the ciphertext chunks in the second set is a subset of an encrypted form of the binary large object, and together the ciphertext chunks in the second set equal the binary large object;
assign a message authentication code (MAC) to each ciphertext chunk in the second set;
store the encrypted data chunks in one or more of the data stores;
store the encryption keys and the MACs as metadata in the metadata memory;
receive, by the storage service, first user authentication information corresponding to a first authorized user of the binary lame object;
store, in a memory that is separate from the data store, a first access control list, wherein the first access control list includes data relating to the first user authentication information;
receive, by the storage service, a second instance of the binary lame object;
receive, by the storage service, second user authentication information corresponding to a second authorized user of the binary lame object;
discard the second instance of the binary lame object without storing the second instance in the data store; and
store, in a second access control list, data relating to the second user authentication information.

15. The system of claim 14, wherein the program instructions, when executed, also instruct one or more of the processors to store, in the metadata, a data store location, wherein the data store location corresponds to a storage location of one or more of the data chunks in the first set or the second set.

* * * * *